US007919131B2

(12) United States Patent
Fletcher et al.

(10) Patent No.: US 7,919,131 B2
(45) Date of Patent: Apr. 5, 2011

(54) EXTRACTION OF COMPOUNDS FROM DAIRY PRODUCTS

(75) Inventors: Andrew Fletcher, Palmerston North (NZ); Katrina Fletcher, Palmerston North (NZ); Owen Catchpole, Wellington (NZ); John Grey, Wellington (NZ)

(73) Assignee: Fonterra Co-Operative Group Limited, Auckland (NZ)

( * ) Notice: Subject to any disclaimer, the term of this patent is extended or adjusted under 35 U.S.C. 154(b) by 1204 days.

(21) Appl. No.: 10/543,446

(22) PCT Filed: Jan. 30, 2004

(86) PCT No.: PCT/NZ2004/000014
§ 371 (c)(1),
(2), (4) Date: Jul. 17, 2006

(87) PCT Pub. No.: WO2004/066744
PCT Pub. Date: Aug. 12, 2004

(65) Prior Publication Data
US 2006/0275533 A1    Dec. 7, 2006

(30) Foreign Application Priority Data
Jan. 31, 2003    (NZ) ....................................... 523920

(51) Int. Cl.
*A23C 9/00*    (2006.01)
(52) U.S. Cl. ........ 426/491; 426/429; 426/385; 426/386; 426/387; 426/580; 426/651
(58) Field of Classification Search .................. 426/429, 426/491, 385, 386, 387, 580, 651; 260/236.5, 260/236.6; 252/522
See application file for complete search history.

(56) References Cited

U.S. PATENT DOCUMENTS

| | | |
|---|---|---|
| 3,795,750 A | 3/1974 | Levine |
| 3,900,288 A | 8/1975 | Levine |
| 4,048,343 A | 9/1977 | Levine |
| 4,062,882 A | 12/1977 | Gupta |
| 4,069,351 A | 1/1978 | Yano et al. |
| 4,136,065 A | 1/1979 | Yano et al. |
| 4,157,404 A | 6/1979 | Yano et al. |
| 4,234,619 A | 11/1980 | Yano et al. |
| 4,367,178 A | 1/1983 | Heigel et al. |
| 4,422,966 A | 12/1983 | Amer |
| 4,560,513 A | 12/1985 | Coenen et al. |
| 4,703,060 A | 10/1987 | Traitler et al. |
| 5,210,240 A | 5/1993 | Peter et al. |
| 5,405,633 A | 4/1995 | Heidlas et al. |
| 5,597,602 A | 1/1997 | Peter et al. |
| 5,616,325 A | 4/1997 | Xiu |
| 5,677,472 A | 10/1997 | Nyberg et al. |
| 5,750,709 A | 5/1998 | Castor |
| 5,925,737 A | 7/1999 | Tomasula et al. |
| 5,932,101 A | 8/1999 | Kanel et al. |
| 6,207,209 B1 | 3/2001 | Muralidhara et al. |

FOREIGN PATENT DOCUMENTS

| | | |
|---|---|---|
| DE | 19724604 | 12/1998 |
| DE | 19828799 | 12/1999 |
| EP | 0 125 690 A2 | 11/1984 |
| EP | 0 531 104 A2 | 10/1993 |
| EP | 0 749 693 B1 | 12/1996 |
| GB | 1347727 | 2/1974 |
| JP | 62 134042 | 6/1987 |
| JP | 3047192 | 2/1991 |
| JP | 1994279229 A | 10/1994 |
| JP | 07 087886 | 4/1995 |
| JP | 2001 293076 | 10/2001 |
| NZ | 500824 | 9/2001 |
| SU | 1722327 | 3/1989 |
| WO | WO 91/14377 | 10/1991 |
| WO | WO 92/08363 | 5/1992 |
| WO | WO 93/04671 | 3/1993 |
| WO | WO 94/18289 | 8/1994 |
| WO | WO 94/25552 | 11/1994 |
| WO | WO 00/34292 | 6/2000 |
| WO | WO 01/28650 | 4/2001 |

OTHER PUBLICATIONS

JP-52101208-A-Abstract.*
NL-7111535-A-Abstract.*
English Abstract of DE 19724604, Dec. 17, 1998, Ober et al.
English Abstract of DE 19828799, Dec. 30, 1999, Schneider et al.
International Search Report for PCT NZ2004/000014, Apr. 8, 2004.
Acosta et al., "Supercritical extraction of fat from phospholipids biomembrane structures," *J. Supercrit. Fluids* 7, 191-196 (1994).
Catchpole et al., "Extraction of chilli, black pepper and ginger with supercritical $CO_2$, subcritical propane and subcritical dimethylether," submitted to $4^{th}$ International Symposium on High Pressure Process Technology and Chemical Engineering, Venice (2002). Catchpole et al., "Extraction of chilli, black pepper, and ginger with near-critical $CO_2$, propane, and dimethyl ether: analysis of the extracts by quantitative nuclear magnetic resonance," *J. Agric. Food Chem.*, 51(17):4853-60 (Aug. 13, 2003).
Florusse et al., "Phase behaviour of the binary system near-critical dimethylether and tripalmitin: measurements and thermodynamic modeling," *J. Supercrit. Fluids*, 22, 1-3 (2002).
Heidlas, J., "De-oiling of lecithins by near-critical fluid extraction," *Agro-Food-Industry Hi-Tech*, 9011 (Jan./Feb. 1997).
Hofland et al., "Isoelectric precipitation of casein using high pressure $CO_2$," *Ind. Eng. Chem. Res.*, 38, 4919-4927 (1999).
Holldorff et al., "Binary vapor-liquid-liquid equilibrium of dimethyl ether—water and solubilities of methyl chloride and water: experimental results and data reduction," *Fluid Phase Equil.*, 44, 185-209 (1988).

(Continued)

*Primary Examiner* — Keith D Hendricks
*Assistant Examiner* — Hamid R Badr
(74) *Attorney, Agent, or Firm* — Knobbe Martens Olson & Bear LLP

(57) ABSTRACT

The present invention relates to processes for the treatment of dairy products and dairy process streams to produce lipids and substantially defatted protein streams. More specifically it relates to the use of near critical fluid extraction techniques to extract lipids from liquid dairy products and dairy process streams. Preferred solvents for use in the described near critical extraction techniques are ether based solvents that are partially miscible with water. A particularly preferred solvent for use in the invention is dimethyl ether.

16 Claims, 4 Drawing Sheets

OTHER PUBLICATIONS

Maxwell, R.J., "Solubility measurements of lipid constituents in supercritical fluids," *Supercritical Fluid Technology in Oil and Lipid Chemistry*, J.W. King, G.R. List (eds.) AOCS Press, Champaign, USA (1996).

English Abstract of WO 01/28650, Apr. 26, 2001, Deschamps et al.

Montanari et al., "Selective extraction of phospholipids from soybeans with supercritical carbon dioxide and ethanol," *Journal of supercritical Fluids*, 14, 87-93 (1999).

Reid et al., "The properties of gases and liquids," $4^{th}$ ed., 676-678, McGraw-Hill, New York (1987).

Taylor et al., "Enrichment and fractionation of phospholipids concentrates by supercritical fluid extraction and chromatography," *Italian Journal of Food Science*, 12, 65-76 (2000).

Terberikler et al., "Selective extraction of phosphatidylcholine from lecithin by supercritical carbon dioxide/ethanol mixture," *JAOCS*, 78, 115-119 (2002).

Thiering et al., "Fractionation of soybean proteins with pressurized carbon dioxide as a volatile electrolyte," *Biotech. Bioeng.* 73, 1-11 (2001).

Wang et al., "Extraction of milk fat in high pressure solvents," *J. Food Proc. Pres.*, 19, 409-425 (1995).

Weidner et al., "Deoiling of crude lecithin with propane," *Fat Science & Technology* 95, 347-351 (1993).

Astaire, J C. et al., "Concentration of Polar MFGM Lipids from Buttermilk by Microfiltration and Supercritical Fluid Extraction", *J. Dairy Sci.* 86: 2297-2307, American Dairy Association, 2003.

*AOAC Official Methods of Analysis*, 2000 $17^{th}$ Ed., Sec. 33.2.26, Method 989.05, Chapter 33, pp. 18-19, AOAC International, Gaithersberg, MD.

Richardson, R., "Determination of fat in dairy products using pressurized solvent extraction," *Journal of AOAC International*, 2001, pp. 1522-1533, vol. 84, No. 5.

\* cited by examiner

EXTRACTION OF COMPOUNDS FROM DAIRY PRODUCTS

REFERENCE TO RELATED APPLICATIONS

The present application is the U.S. National Phase of International Application PCT/NZ2004/000014, filed Jan. 30, 2004 and claims priority to New Zealand Patent Application No. 523920, filed Jan. 31, 2003.

INTRODUCTION

The present invention relates to processes for the treatment of dairy products and dairy process streams to produce lipids and substantially defatted protein streams. More specifically it relates to the use of near critical fluid extraction techniques to extract lipids from liquid dairy products and dairy process streams.

BACKGROUND

It is well known that dairy products and process streams are a complex mixture of proteins, lipids, sugars and minerals. At present, there are limited methods available for extracting and refining specific components from such streams, and the separation of lipids from proteins in whey-based streams is difficult.

Acid precipitation, heat precipitation, enzymic precipitation, centrifugal separation, membrane filtration and ion exchange are well known methods of separating out components from milk and milk by products. However, these methods are often not cost efficient and often do not produce the desired yields. Also, certain extraction processes must be done under conditions that irreversibly alter the physical properties of the separated components (for example the denaturation of proteins).

WO 91/14377 and WO 92/08363 describe the use of supercritical carbon dioxide and subcritical carbon dioxide for the partial extraction of lipids and fractional precipitation of proteins from dairy products and process streams respectively. However, lipid yields are low using these techniques, with both publications showing limited success and no extraction of useful phospholipids and sphingolipids.

It is therefore an object of the present invention to provide an improved or alternative process for extracting a range of lipids from dairy products and dairy process streams.

SUMMARY OF INVENTION

In a first aspect, the invention broadly comprises a method for treating a dairy product or a dairy process stream comprising at least the steps of:
  a) contacting said dairy product or dairy process stream with an ether based solvent that is partially miscible with water, said ether based solvent being at a near critical temperature and pressure, to produce a near critical fluid phase containing lipids;
  b) separating the near critical fluid phase from the dairy product or dairy process stream to produce a substantially defatted dairy product or dairy process stream; wherein the dairy product or dairy process stream has a moisture content of greater than 75%; and
  c) reducing the pressure of the near critical fluid phase to recover the lipids.

Preferably the solvent is gaseous at room temperature.

More preferably the solvent is dimethyl ether or a mixture of dimethyl ether and water at or below the solubility of water in dimethyl ether.

Preferably the dimethyl ether is at a pressure of at least the vapour pressure at the extraction temperature.

Preferably the dimethyl ether is at a temperature between about 10 degrees Celsius and about 70 degrees Celsius.

More preferably the dimethyl ether is at a temperature between about 40 degrees Celsius and about 60 degrees Celsius Preferably the dairy product or dairy process stream is selected from whey based streams, milk fat by-products, milk and cream.

Most preferred dairy product or process streams useful according to the present invention may be selected from whey, whey protein concentrate retentates, whey protein isolate by-products, butter by-products, anhydrous milkfat by-products or lipid containing dairy effluents. The dairy product or process streams may be either liquid in their normal state, thawed from frozen, or reconstituted from powders.

Preferably the moisture content of the dairy product or process stream is greater than about 75% and less than about 99%.

More preferably the moisture content of the dairy product or process stream is between about 80 and 95%, most preferably between 85 and 90%.

Preferably the dairy product or dairy stream is contacted with the solvent in a continuous manner.

In a further aspect, the invention provides an extract from a dairy product or dairy process stream obtained by any of the above methods.

In yet a further aspect, the invention provides a substantially defatted dairy product or dairy process stream obtained by any of the above methods.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

The invention consists in the foregoing and also envisages constructions of which the following gives examples.

DETAILED DESCRIPTION

Figure 1:
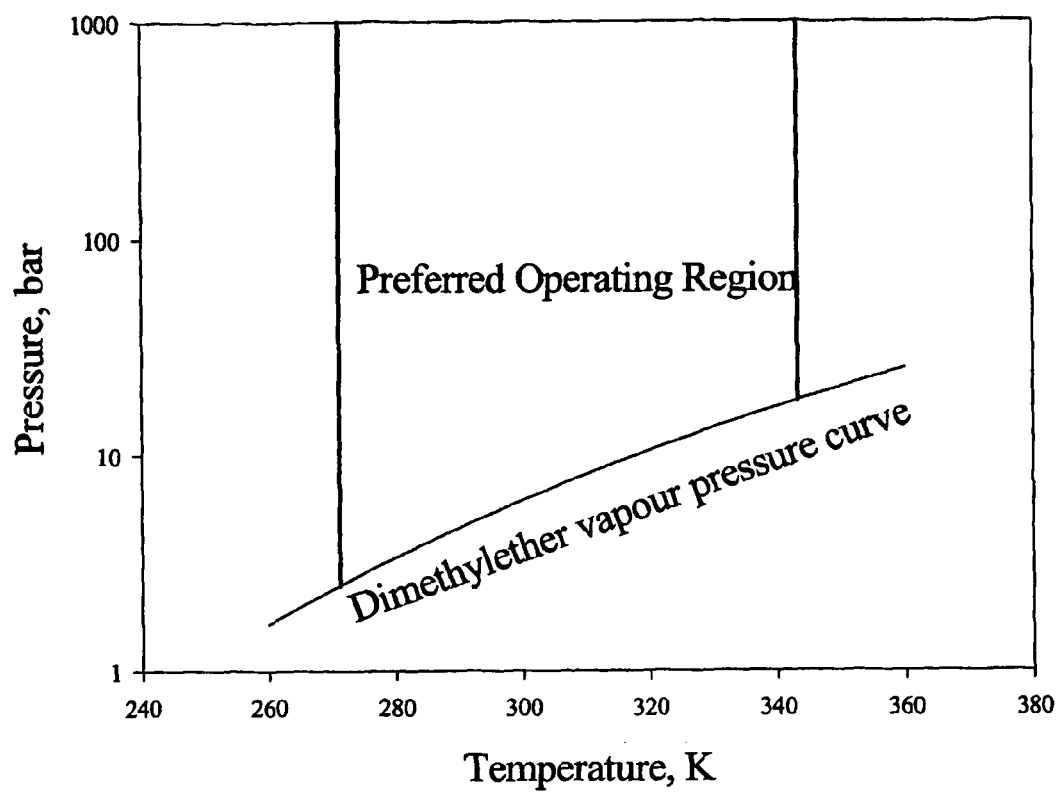
FIG. 1 is a graph indicating the preferred operating region of dimethyl ether with respect to its pressure and temperature.

Every substance has its own "critical" point at which the liquid and vapour state of the substance become identical. Above but close to the critical point of a substance, the substance is in a fluid state that has properties of both liquids and gases. The fluid has a density similar to a liquid, and viscosity and diffusivity similar to a gas. The term "supercritical" as used herein refers to the pressure—temperature region above the critical point of a substance. The term "subcritical" refers to the pressure—temperature region equal to or above the vapour pressure for the liquid, but below the critical temperature.

The term "near critical" as used herein encompasses both supercritical and subcritical regions, and refers to pressures and temperatures near to the critical point.

As noted above, dairy products and dairy process streams are a complex mixture of proteins, lipids, sugars and minerals. Useful lipids present in dairy products and dairy process streams include phospholipids and sphingolipids.

Near-critical fluids are useful solvents for lipids. Supercritical $CO_2$ is known to be used to extract neutral lipids, but in combination with ethanol as a co-solvent, can also be used to extract some classes of phospholipids. Propane is known to be a solvent suitable for extracting neutral lipids and phospholipids.

DME has previously been used in the extraction of flavours and aromas from solid food materials (see Yano et al U.S. Pat. No. 4,069,351 and U.S. Pat. No. 4,136,065), lipids from raw egg yolk (Yano et al U.S. Pat. No. 4,157,404) and dried egg powder (Yano et al U.S. Pat. No. 4,234,619). In U.S. Pat. No. 4,157,404, Yano states that while lipids can be extracted from raw egg yolk (75% moisture content), the proteins are denatured. In U.S. Pat. No. 4,234,619; Yano states that proteins are not denatured if the egg yolk is dry, but the phospholipids can only be partially extracted.

We have found that the denaturation of protein obtained by DME extraction techniques can be reduced or eliminated by ensuring that the moisture content of the starting dairy product or dairy stream is greater than 75%; and that addition of water to the DME as a co-solvent, to account for water that is co-extracted with lipids, assists in the prevention of denaturation.

We have also found that the short contact times that result from the continuous process of the invention (between the solvent and the dairy product or dairy stream) minimises the denaturation of proteins obtained by DME extraction techniques.

The contact time is length of time that the dairy stream or dairy product is exposed to the solvent at near-critical conditions.

In a preferred embodiment of the invention, the dairy stream or dairy product is contacted with the solvent in a contacting device suitable for continuous processing, such as—but not limited to—a nozzle, static mixer or porous membrane contactor. Separation of the defatted dairy stream (or dairy product) and near-critical solvent thus may take place immediately after the contacting device, and the contacting time is thus of the order of seconds.

The treatment of dairy products and dairy streams with moisture contents greater than 75% in a continuous manner with short contact times enables the extraction of lipids (including phospholipids and sphingolipids), leaving an aqueous stream containing substantially defatted, soluble dairy proteins.

FIG. 1 shows the vapour pressure curve for DME, and specifically may be used to ascertain the state of DME at a given pressure and temperature combination. Using this information, suitable conditions can be created so as to achieve maximum yield.

Figure 2:
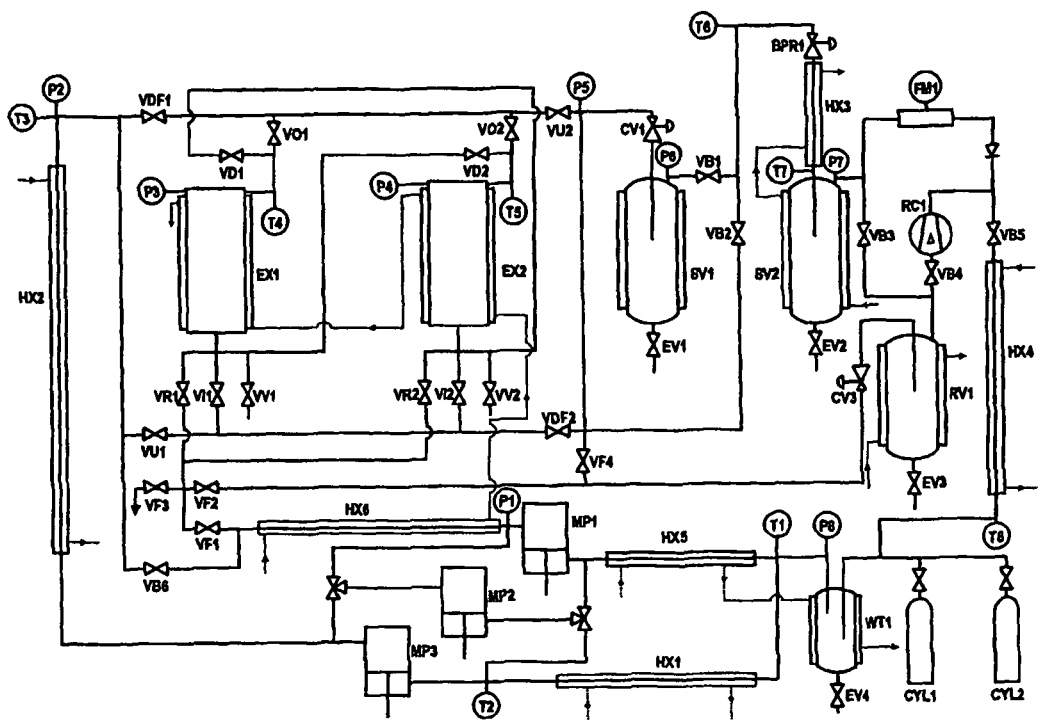
FIG. 2 is a schematic diagram of equipment used for near critical extraction from solids.
Figure 3:
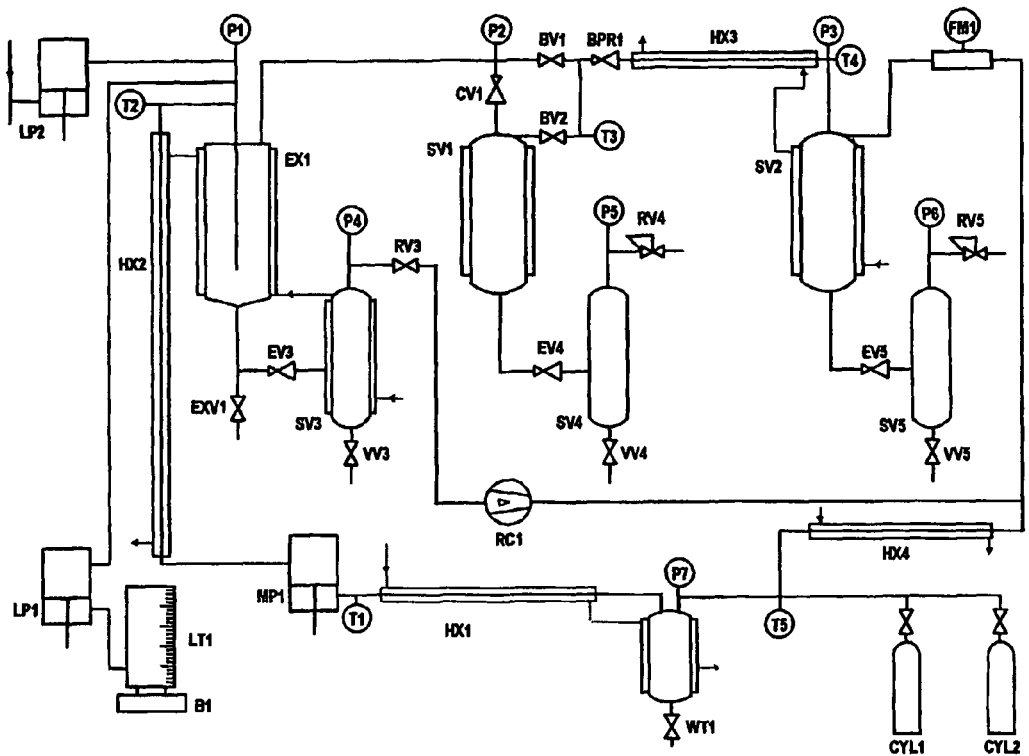
FIG. 3 is a schematic diagram of equipment used for near critical extraction from liquids.

FIGS. 2 and 3 are schematic diagrams of equipment that may be used for near critical extraction techniques, and are described in further detail in the examples.

Figure 4:
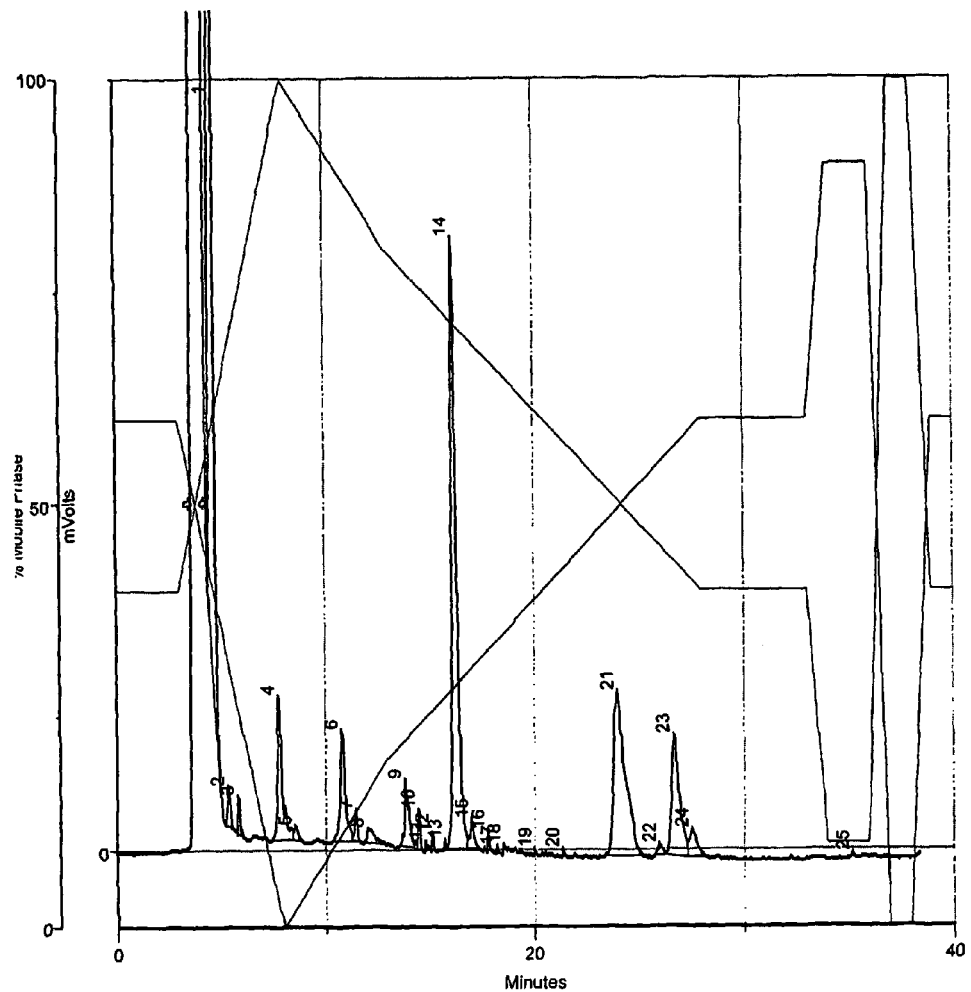
FIG. 4 is a HPLC chromatogram of a typical extract showing phospholipid and sphingolipids that are extracted.

FIG. 4 is an HPLC Chromatogram of a lipid extract (see example 5, high fat WPC type B). The key to the numbered peaks are as follows: 1-3, neutral lipids (71% of extract); 4-8' unknowns; 9-10, phosphatidyl inositols; 11-12, unknowns; 13-15, phosphatidylethanolamine; 16-20, unknowns; 21, phosphatidylcholine; 22-24, sphingomyelins.

The desired temperature range, especially for dairy streams containing whey proteins, is about 40 to 60 degrees Celsius. Over this narrow range, it is known that whey proteins reversibly unfold in solution, and it is postulated that this unfolding enables the near critical solvent access to the lipids to enable extraction.

Operation outside the preferred region is possible but leads to lower yields and freezing of products for temperatures below the desired range, and to thermal denaturation of proteins for temperatures above the desired range.

The methods of the present invention produce both lipid extracts and substantially defatted aqueous protein streams. The lipid extracts can be used in, for example, health foods, dietary supplements, pharmaceuticals and cosmetics, while the depleted dairy product or dairy process stream (substantially defatted protein streams) may be used in, for example, dairy products (e.g. cheeses, cultured foods and beverages, ice-cream, chocolate), nutrition bars and baked goods.

The above describes some preferred embodiments of the present invention and indicates several possible modifications but it will be appreciated by those skilled in the art that other modifications can be made without departing from the scope of the invention.

EXAMPLES

Method and Apparatus

Extraction from Dairy Solids

The apparatus for the extraction of dairy-based solids (especially whey protein concentrate (WPC) powder) at a pilot scale is shown in FIG. 2. There are two extraction vessels to enable semi-continuous extraction of solids, and separate pumps for compressing the solvents and emptying and refilling the extraction vessels. A measured mass of WPC powder was added to a stainless steel basket that had porous plates at either end to allow the passage of solvent, but not powder. The basket and powder was then added to one of the extraction vessels, EX1 or EX2 which was then filled to the cylinder pressure with near-critical solvent. $CO_2$, propane or DME was compressed to the operating pressure by an air driven pump (MP3 for $CO_2$, MP2 for propane or DME) and then heated to the operating pressure in HX2. The solvent then passed downwards through one of the extraction vessels (usually EX1) via valves VDF1, VO1, VI1, VDF2 before passing through separation vessels 1 and 2 to deposit extract (or separation vessel 2 only for propane and DME).

The solvent was then recycled back to the pump via heat exchanger HX4, water trap WT1 and sub-cooler HX1 or HX5. Extract samples were taken at regular time intervals from valves EV1 and EV2 as appropriate. Extractions were carried out for 90-120 minutes.

Method and Apparatus—Extraction from Dairy Liquids

The 10 liter apparatus for the fractionation of liquid dairy components, especially whey protein concentrates (WPC) using $CO_2$, dimethyl ether (DME) or propane is shown in FIG. 3, and is described with reference to this figure. The apparatus is described for the use of DME as the solvent, and WPC as the dairy component. DME was supplied to the apparatus by liquid supply cylinders CYL1 and 2. The DME then passed through a chilled water trap WT1 and condenser/subcooler HX1 before being compressed to the operating pressure by a positive displacement pump MP1. The compressed solvent then passed through preheater heat exchanger HX2, and then into the extraction vessel EX1 via a vertical downcorner tube, or downcorner tube and static mixer. Simultaneously, WPC was withdrawn from a supply tank LT1 mounted on a balance B1, was then compressed to the operating pressure by piston pump LP1, and then passed through a heat exchanger (not shown). The high pressure WPC was then mixed with the solvent in a cross joint just prior to the downcorner tube/static mixer that passed into EX1. Co-solvent (water) could also be added at the cross joint. This was supplied from another storage tank (not shown), and compressed to the operating pressure using pump LP2. Partially or fully defatted WPC was sprayed into the bottom of the vessel, and was recovered at regular time intervals from the base of EX1 via valve EV3.

Water was added to the base of the vessel in some experiments to provide a 'water pool' for the WPC to spray into. As WPC was recovered through valve EV3, the solution pressure was reduced from the operating pressure to cylinder pressure. WPC solution was then recovered from the base of auxiliary collection vessel SV3, while DME that flashed off from the solution was recycled via valve RV3, and recompressed via compressor RC1. The lipids and some water were dissolved in the DME, and left the extraction vessel via an outlet near the top of the vessel, and then passed through valve BV1 to bypass the first separation vessel. The combined DME rich solution then passed through a back-pressure regulator BPR1, where the pressure was reduced to cylinder pressure (~5-6 bar), and then through heat exchanger HX3 and into jacketed separation vessel SV2. The extract (lipids and water) was precipitated into this vessel. This extract was recovered at regular time intervals by further depressurisation through valve EV5 into an additional separator SV5 to avoid freezing of the extract, and then through valve VV5. The additional separator was found to be unnecessary for DME, due to the high water content of the extract. The bulk of the DME exited the top of SV2 and then passed through a coriolis mass flow meter FM1, cooler heat exchanger HX4 before being recycled back to MP1 via the water trap WT1. When $CO_2$ was used, the intermediate separator SV1 was also used to enable two-stage fractionation of the extracts. Similarly, when ethanol was used as a co-solvent, separator SV5 was used to efficiently recover the ethanol, and flash off the propane or $CO_2$ to the vent.

The liquid dairy components apparatus and method was modified according to the dairy component extracted, solvent used, and method of contacting between the liquid and solvent. Raffinate (defatted dairy component) was recovered by depressurisation to atmospheric through valve EXV1 when using $CO_2$. For propane and DME, this resulted in excessive foaming of the raffinate as the solvent flashed off, and freezing of the protein stream, all of which caused protein denaturation, and so an additional separator was used. A static mixer was employed after the cross joint to provide better mixing between the DME, liquid dairy stream and water co-solvent. Vessel EX1 was converted to a countercurrent packed column by placing 12 mm stainless steel Pall rings on top of a liquid/gas distribution plate inside the vessel to form a randomly packed bed, and changing the inlet points for the solvent and liquid dairy stream to the bottom and top of the vessel respectively. The liquid raffinate was withdrawn from the base of EX1, and the solvent and extract phase from the top of EX1.

Results

Example 1

Extraction of Dairy WPC Solids

This example shows that the yield of lipids from dairy WPC solids is very low for all near-critical solvents, and thus extraction is generally more effective from liquid solutions. Whey protein concentrate powders with the composition 80.26% by mass protein, 6.83% by mass lipid, and a total solids content of 96.43% were extracted with the near-critical solvents carbon dioxide, propane, and dimethyl ether. Additional laboratory scale experiments were performed with dimethyl ether at elevated temperatures. The solvent, pressure, temperature, mass of solids used, mass of solvent used, and extract solids and lipid yields are given in table 1.

TABLE 1

Lipid yields for the extraction of WPC solids with various solvents

| Solvent | Pressure bar | Temperature K | Mass of solids used, g | Mass of solvent used, kg | Mass of Extract, g | Yield, % solids | Yield, % lipids |
|---|---|---|---|---|---|---|---|
| $CO_2$ | 300 | 317.1 | 3600.0 | 18.9 | 2.69 | 0.07 | 1.05 |
| Propane | 32 | 314.1 | 3600.0 | 11.8 | 3.97 | 0.11 | 1.56 |
| DME | 32 | 314.1 | 3600.0 | 10.9 | 4.58 | 0.13 | 1.80 |
| DME | 55 | 323.9 | 129.2 | 0.41 | 0.34 | 0.26 | 3.60 |
| DME | 55 | 333.1 | 129.1 | 0.42 | 0.56 | 0.43 | 5.95 |

The lipid yields are very low and an increase in extraction temperature did not increase the extraction yield to desirable level.

Example 2

Extraction of Dairy WPC Liquids; 80% Protein

This example shows that an ether based solvent miscible with water (in this case dimethyl ether) may be used as a solvent—with and without water as a co-solvent—for the extraction of lipids from liquid dairy WPC streams. Fresh whey protein concentrate containing 80.26% by mass protein, 6.83% by mass lipid, and a total solids content of 96.43% on a powder basis; and 21.45% solids on an as-received basis was extracted with supercritical carbon dioxide at 300 bar with and without ethanol as a co-solvent; near-critical propane with and without ethanol as a co-solvent; and dimethyl ether with and without water as a co-solvent. The solvent, pressure, temperature, mass of solids used, mass of solvent used, and extract solids and lipid yields are given in table 2.

TABLE 2

Lipid yields for the extraction of WPC solids with various solvents

| Solvent | Co-solvent, % by mass | Mass of WPC, kg | Mass of solvent used, kg | Pressure bar | Temperature K | Lipid yield |
|---|---|---|---|---|---|---|
| DME | none | 2.086 | 29.88 | 40-45 | 313 | 93.3 |
| Propane | none | 1.115 | 4.13 | 44 | 312 | 0 |
| $CO_2$ | none | 2.023 | 33.51 | 300 | 317 | 1.6 |
| $CO_2$ | ethanol, 6.0 | 2.018 | 28.65 | 300 | 301-313 | 11.5 |
| Propane | ethanol, 8.6 | 1.992 | 34.78 | 37 | 313 | 12.5 |
| DME | water, 6.6 | 1.984 | 26.51 | 46-50 | 290 | 41.3 |

The yield of lipid using DME without water as a co-solvent was very high, but the proteins were extensively dried and denatured; and could not be easily recovered from the extraction vessel as they became insoluble in water. The use of water as co-solvent at a reduced extraction temperature of 290 K reduced the lipid yield to 41.3%, but enabled a quantitative recovery of partially defatted protein in solution. The protein-rich raffinate stream recovered from the propane trial formed a long-lasting, vigorous foam. No lipids were extracted. When ethanol was used as a cosolvent with propane, the lipid yield increased from zero to 12.5%, but some ethanol was recovered in the raffinate protein-rich stream, and a sludge layer of denatured protein formed upon standing at room temperature in this stream. Supercritical carbon dioxide gave a lipid yield of only 1.6%. The use of ethanol as a co-solvent increased the lipid yield to 11.5%, but again resulted in a protein-rich raffinate stream containing some ethanol. A sludge layer of denatured protein formed upon standing at room temperature.

Example 3

Extraction of Reconstituted High-Fat Whey Protein Concentrate (WPC)

This example shows the effect of solids concentration on the yield of lipids from high-fat retentates arising from the production of whey protein isolates by membrane filtration. High fat WPC solids with the composition 61.95% protein, 9.72% lipid, 3.04% moisture, balance lactose and ash was reconstituted with distilled and deionized water to solids (as received) concentrations of 7.2, 14 and 21% by mass, equivalent to protein and lipid contents of 4.52 and 0.78; 8.67 and 1.36; 13.01 and 1.36% by mass respectively. The reconstituted WPC liquids were extracted using the apparatus shown in FIG. 3. A static mixer was used to promote mixing of the retentate and dimethyl ether. The lipid yields are given as a percentage of the total available for extraction, and are summarised in table 3.

TABLE 3

Lipid yields from reconstituted high-fat WPC retentates

| Solvent | Co-solvent, % by mass | Mass of WPC, kg | Solids content % | Mass of solvent used, kg | Pressure bar | Temp K | Lipid yield |
|---|---|---|---|---|---|---|---|
| DME | none | 4.13 | 7.2 | 38.14 | 40 | 323 | 64.7 |
| DME | water, 5.3 | 4.50 | 14 | 49.39 | 40 | 321 | 50.2 |
| DME | water, 7.4 | 3.57 | 21 | 36.43 | 40 | 324 | 33.7 |

The lipid yield decreases as the solids concentration increases, and is almost zero when dry solids are used, as shown in example 1.

Example 4

Extraction of Reconstituted High-Fat NPC and Preparation of the Lipid Extract and Defatted Protein Products High fat WPC solids with the composition 61.95% protein, 9.72% lipid, 3.04% moisture, balance lactose and ash was reconstituted with distilled, deionized water to give the following liquid composition of 8.80% whey protein, 1.56% lipids, 13.56% total solids, balance distilled water. 56.4 kg of the reconstituted WPC was extracted with 474.2 kg of dimethyl ether at 323 K and a pressure of 42 bar in the continuous flow apparatus (FIG. 3) utilising a static mixer. 29.4 kg of water co-solvent was continuously added to the dimethyl ether to account for extraction of water from the whey protein concentrate. 28.3 kg of extract was recovered, which was then evaporated to dryness in a rotary vacuum evaporator to yield 624.8 g of lipid at a yield of 71% of the total lipid available. The lipid contained 29.0% phospholipids. A raffinate stream rich in defatted protein was continuously recovered from the extraction process. The recovered aqueous defatted protein stream with approximately 14% total solids was spray dried to give a powder with the following composition: protein 66.5%; lipids 3.1%, lactose 17.8%, ash 9.0%, moisture 3.9%.

Example 5

Extraction of Reconstituted High Fat WPC from Different Sources

This example shows that pre-heating the WPC prior to contacting with dimethyl ether improves the fat extraction efficiency for high fat WPC produced by either ion exchange or nicrofiltration. High fat WPC obtained by spray drying the ultrafiltered by-product stream of whey protein isolate produced by ion exchange (WPC A); and high fat WPC obtained by spray drying the ultrafiltered by-product stream of whey protein isolate produced by microfiltration (WPC B) were reconstituted to 14% total solids. The dry basis composition of WPC A was 79.2% protein, 10.9% fat, 1.0% lactose, and 3.61% ash, and reconstituted basis was 10.97% protein, 1.5% fat, 0.1% lactose and 0.5% ash, balance distilled water. The dry basis composition of WPC B was 74.6% protein, 11.6% fat, 4.3% lactose and 3.6% ash; and reconstituted basis was 10.21% protein, 1.6% fat, 0.6% lactose, 0.5% ash, balance distilled water. Both reconstituted high fat WPC streams were processed in the apparatus shown in FIG. 3 utilising a static mixer, with two additional modifications: a heat exchanger was inserted between LP1 and EX1 to pre-heat the WPC stream prior to contacting with dimethyl ether; and a heat exchanger was inserted between the base of EX1 and raffinate collection vessel SV3 to heat the raffinate stream to drive off dissolved dimethyl ether. 5917.4 g of the reconstituted WPC A was extracted with 53.97 kg of dimethyl ether at 324 K and a pressure of 40 bar. 2600 g of water co-solvent was continuously added to the dimethyl ether to account for extraction of water from the whey protein concentrate. 3070.5 g of extract was recovered, which was then evaporated to dryness in a rotary vacuum evaporator to yield 82 g of lipid rich extract. The lipid content, equivalent to an 85% overall lipid yield, contained around 32% phospholipids. 5435.6 g of an aqueous raffinate stream rich in defatted soluble protein was continuously recovered from the extraction process, containing 11.89% protein and only 0.25% fat.

6067.5 g of the reconstituted WPC B was extracted with 39.69 kg of dimethyl ether at 326 K and a pressure of 40 bar. 3100 g of water co-solvent was continuously added to the dimethyl ether to account for extraction of water from the whey protein concentrate. 2357.5 g of extract was recovered, which was then evaporated to dryness in a rotary vacuum evaporator to yield 86.1 g of lipid rich extract. The lipid content, equivalent to an 80% overall lipid yield, contained around 29% phospholipids. 6170 g of an aqueous raffinate stream rich in soluble defatted protein was continuously recovered from the extraction process, containing 10.05% protein and only 0.3% fat. WPC B is produced by a similar method to the high fat WPC used in examples 3 and 4: the percentage of lipid extracted has increased from 70% (example 4) to 80%.

Example 6

Extraction of Early and Late Season Beta-Serum

Beta-serum is a phospholipid-rich stream derived from the production of anhydrous milkfat. The composition of this by-product stream is seasonally dependent. The proteins are predominantly casein proteins. In this example lipids are extracted from both fresh and thawed (from frozen) beta serum. Late-season beta-serum with a dry basis composition 30.91% protein, 21.38% lipid, balance lactose and ash was supplied fresh with a total solids content of 10.01%, including protein at 3.09% and lipids at 2.14%. Early season beta serum with a dry basis composition 30.5% protein, 19.5% lipids, 43.9% lactose and 6.1% ash was supplied frozen with a total solids content of 9.69%, including protein at 3.04%, fat at 1.95%, lactose at 4.39% and ash at 0.61%. Both beta serum liquid streams were extracted in the apparatus shown in FIG. 3, with the modifications outlined in example 5. 8664.2 g of late season fresh beta serum was extracted with 80.88 kg of dimethyl ether at 324 K and a pressure of 40 bar. 3679 g of water co-solvent was continuously added to the dimethyl ether to account for extraction of water from the beta serum. 5084.0 g of extract was recovered, which was then evaporated to dryness in a rotary vacuum evaporator to yield 195.0 g of lipid rich extract. The lipid content was equivalent to a 93% overall lipid yield. 7588 g of an aqueous raffinate stream rich in defatted soluble protein was continuously recovered from the extraction process, containing 2.47% protein and only 0.27% fat.

Frozen early season beta serum was thawed and then stirred at room temperature for 2 hours to obtain sample homogeneity. 7949.6 g of thawed early season beta serum was extracted with 80.45 kg of dimethyl ether at 322 K and a pressure of 40 bar. 3400 g of water co-solvent was continuously added to the dimethyl ether to account for extraction of water from the beta serum. 4333.5 g of extract was recovered, which was then evaporated to dryness in a rotary vacuum evaporator to yield 144.6 g of lipid rich extract. The lipid content was equivalent to a 93% overall lipid yield. 6598.2 g of an aqueous raffinate stream rich in defatted soluble protein was continuously recovered from the extraction process, containing 3.45% protein and only 0.50% fat.

Example 7

Extraction of Reduced Lactose Beta Serum

In this example, beta serum that was ultrafiltered to give a low lactose beta serum retentate (LLBS); and then diafiltered to give a very low lactose beta serum retentate (VLBS) were tested at approximately 20% solids concentration. The VLBS and LLBS were produced from the early season beta serum used in example 6. The composition of LLBS, dry basis, was 47.3% protein, 31.7% fat, 16.1% lactose and 4.9% ash. Frozen LLBS was supplied with 23.5% dissolved solids, including 11.1% protein, 7.45% lipids, 3.8% lactose and 1.15% ash. The composition of VLBS, dry basis, was 50.9% protein, 34.2% lipids, 9.9% lactose and 5.0% ash. Frozen VLBS was supplied with 20.18% dissolved solids, including 10.3% protein, 6.90% lipids, 2.0% lactose and 1.0% ash. Both beta serum liquid streams were extracted in the apparatus shown in FIG. 3, with the modifications outlined in example 5. Both LLBS and VLBS were thawed and then stirred at room temperature for 2 hours to obtain sample homogeneity. 7949.8 g of LLBS was extracted with 85.02 kg of dimethyl ether at 317 K and a pressure of 40 bar. 4700 g of water co-solvent was continuously added to the dimethyl ether to account for extraction of water from the beta serum. 5146.2 g of extract was recovered, which was then evaporated to dryness in a rotary vacuum evaporator to yield 478.1 g of lipid rich extract. The lipid content was equivalent to a 74% overall lipid yield. The phospholipid content was 31% of total lipids. 6809.9 g of an aqueous raffinate stream rich in defatted soluble protein was continuously recovered from the extraction process, containing 10.8% protein and only 2.0% fat.

8834.0 g of VLBS was extracted with 95.04 kg of dimethyl ether at 323 K and a pressure of 40 bar. 3800 g of water co-solvent was continuously added to the dimethyl ether to account for extraction of water from the beta serum. 5622.6 g of extract was recovered, which was then evaporated to dryness in a rotary vacuum evaporator to yield 495.1 g of lipid rich extract. The lipid content was equivalent to a 74% overall lipid yield. The phospholipid content was 40% of total lipids. 5094.3 g of an aqueous raffinate stream rich in defatted soluble protein was continuously recovered from the extraction process, containing 11.93% protein and only 2.1% fat.

Example 8

Extraction of Reduced Lactose Beta Serum Diluted to 10% Dissolved Solids

In this example, low lactose beta serum retentate (LLBS); and very low lactose beta serum retentate (VLBS) from example 7 were diluted to approximately 10% solids concentrations by adding distilled deionized water in the correct proportions to the respective thawed and stirred retentates. The diluted serum retentates are renamed LLBSD and VLBSD. The dry basis compositions of LLBSD and VLBSD are unchanged from example 7. LLBSD was produced with 11.1% dissolved solids, including 5.53% protein, 3.50% lipids, 1.5% lactose and 0.5% ash. VLBSD was produced with 9.26% dissolved solids, including 4.7% protein, 3.20% lipids, 0.9% lactose and 0.5% ash. Both beta serum liquid streams were extracted in the apparatus shown in FIG. 3, with the modifications outlined in example 5. Both LLBSD and VLBSD were stored in a refrigerator overnight after being produced from LLBS and VLBS respectively. 7651.4 g of LLBSD was extracted with 78.67 kg of dimethyl ether at 328 K and a pressure of 40 bar. 4250 g of water co-solvent was continuously added to the dimethyl ether to account for extraction of water from the beta serum. 5172.5 g of extract was recovered, which was then evaporated to dryness in a rotary vacuum evaporator to yield 290.7 g of lipid rich extract. The lipid content was equivalent to a 87% overall lipid yield. The phospholipid content was 49.2% of total lipids. 6103.8 g of an aqueous raffinate stream rich in defatted soluble protein was continuously recovered from the extraction process, containing 6.52% protein and only 0.5% lipid, with a phospholipid content of 52.4% of total lipids. There was a significant increase in lipid yield and reduction in residual lipids in the raffinate compared to LLBS in example 7.

6885.9 g of VLBSD was extracted with 75.49 kg of dimethyl ether at 318 K and a pressure of 40 bar. 4150 g of water co-solvent was continuously added to the dimethyl ether to account for extraction of water from the beta serum. 5834.5 g of extract was recovered, which was then evaporated to dryness in a rotary vacuum evaporator to yield 226.0 g of lipid rich extract. The lipid content was equivalent to a 86% overall lipid yield. The phospholipid content was 46.5% of total lipids. 5362.6 g of an aqueous raffinate stream rich in defatted soluble protein was continuously recovered from the extraction process, containing 6.52% protein and only 0.5% lipid, with a phospholipid content of 47.9% of total lipids. There was a significant increase in lipid yield and reduction in residual lipids in the raffinate compared to VLBS in example 7.

What we claim is:

1. A method for treating a dairy product or dairy process stream comprising at least the steps of:
   a) contacting a liquid dairy product or dairy process stream comprising a moisture content of greater than 75% with an ether based solvent that is gaseous at room temperature and that is partially miscible with water, said ether based solvent being at a near critical temperature and pressure, to produce a near critical fluid phase containing lipids;
   b) separating the near critical fluid phase from the dairy product or dairy process stream to produce a defatted dairy product or dairy process stream; and
   c) reducing the pressure of the near critical fluid phase to recover the lipids.

2. A method according to claim 1 wherein the solvent is at a temperature between about 10 degrees Celsius and about 70 degrees Celsius.

3. A method according to claim 1 wherein the solvent is at a temperature between about 40 degrees Celsius and about 60 degrees Celsius.

4. A method according to claim 1 wherein the dairy product or dairy process stream is selected from whey, milk fat, milk and cream.

5. A method according to claim 4 wherein the dairy product or dairy process stream is selected from the following: whey, whey protein concentrate retentates, whey protein isolate by-products, butter by-products, anhydrous milk fat by-products and lipid containing dairy effluents.

6. A method according to claim 1 wherein the dairy product or dairy process stream has been thawed from a frozen state.

7. A method according to claim 1 wherein the dairy product or dairy process stream has been reconstituted from powder.

8. A method according to claim 1 wherein the moisture content of the dairy product or dairy process stream is greater than 75% and less than about 99%.

9. A method according to claim 1 wherein the moisture content of the dairy product or dairy process stream is between about 80% and 90%.

10. A method according to claim 1 wherein the moisture content of the dairy product or dairy process stream is between about 85% and 90%.

11. A method according to claim 1 wherein the solvent is dimethyl ether.

12. A method according to claim 1 wherein the solvent is a mixture of dimethyl ether and water at or below the solubility of water in dimethyl ether.

13. A method according to claim 1 wherein the solvent is at a pressure of at least the vapour pressure of the solvent at the near critical temperature.

14. A method according to claim 1 wherein the dairy product or dairy process stream is contacted with the solvent in a continuous manner.

15. A method according to claim 1, wherein the solvent is at a pressure of at least 32 bar.

16. The method according to claim 1, wherein the lipids comprise phospholipids or sphingolipids.

* * * * *